US 9,444,764 B2

(12) United States Patent
Calvo

(10) Patent No.: US 9,444,764 B2
(45) Date of Patent: Sep. 13, 2016

(54) SCALABLE AND SECURE INTERCONNECTIVITY IN SERVER CLUSTER ENVIRONMENTS

(71) Applicant: STATE FARM MUTUAL AUTOMOBILE INSURANCE COMPANY, Bloomington, IL (US)

(72) Inventor: Lynn Calvo, Fayetteville, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/600,960

(22) Filed: Jan. 20, 2015

(65) Prior Publication Data
US 2016/0212063 A1  Jul. 21, 2016

(51) Int. Cl.
*H04L 29/08* (2006.01)
*H04L 12/911* (2013.01)
*H04L 29/06* (2006.01)
*G06F 9/50* (2006.01)

(52) U.S. Cl.
CPC ....... *H04L 47/781* (2013.01); *H04L 29/08144* (2013.01); *H04L 63/08* (2013.01); *G06F 9/5005* (2013.01)

(58) Field of Classification Search
CPC .................. G06F 9/50–9/505; G06F 9/5072; H04L 29/08144
USPC ........................................................ 709/226
See application file for complete search history.

(56) References Cited

U.S. PATENT DOCUMENTS

| | | | | |
|---|---|---|---|---|
| 2003/0055968 | A1* | 3/2003 | Hochmuth | H04L 12/24 709/226 |
| 2004/0040025 | A1* | 2/2004 | Lehtinen | G06F 9/4881 718/104 |
| 2005/0083842 | A1* | 4/2005 | Yang | H04L 12/5695 370/230 |
| 2006/0095944 | A1* | 5/2006 | Demircin | H04N 19/172 725/81 |
| 2006/0212871 | A1* | 9/2006 | Cook | G06F 9/5044 718/104 |
| 2009/0037686 | A1* | 2/2009 | Mendonca | G06F 21/50 711/173 |
| 2011/0075667 | A1* | 3/2011 | Li | H04L 12/4633 370/392 |
| 2013/0055091 | A1* | 2/2013 | Dutta | G06F 9/5077 715/736 |

OTHER PUBLICATIONS

Khetrapal et al., "Demystifying Routing Services in Software-Defined Networking", Aricent, 2013, 12 pages.
Roy et al., "MPICH-GQ: Quality-of-Service for Message Passing Programs", Proceedings of the IEEE/ACM SC2000 Conference, Nov. 2000, 11 pages.

* cited by examiner

Primary Examiner — Jeong S Park
(74) Attorney, Agent, or Firm — Marshall, Gerstein & Borun LLP; Randall G. Rueth

(57) ABSTRACT

A computer implemented method may manage network resources within a server cluster. The server cluster may include any number or switches and servers connected via one or more network links. In one aspect, the method may receive a request for provisioning of an application and retrieve management data defining a network topology of the server cluster. The method may also determine a maximum network bandwidth for each network link in the server cluster, a required amount of bandwidth for the application and a resource allocation of network bandwidth for the application to accommodate the maximum network bandwidth for each network link. The method may further provision the application to a network resource within the server cluster with the resource allocation of network bandwidth.

18 Claims, 6 Drawing Sheets

SCALABLE AND SECURE INTERCONNECTIVITY IN SERVER CLUSTER ENVIRONMENTS

FIELD OF THE INVENTION

The present disclosure relates to software defined networking in server cluster environments and, more particularly, to platforms and techniques for management of bandwidth and connectivity between network resources in server cluster environments.

BACKGROUND

The increasing usage of the Internet by individual users, companies, and other entities, as well as the general increase of available data, has resulted in a collection of data sets that is both large and complex. In particular, the increased prevalence and usage of mobile devices, sensors, software logs, cameras, microphones, radio-frequency identification (RFID) readers, and wireless networks have led to an increase in available data sets. This collection of data sets is often referred to as "big data." Because of the size of the big data, existing database management systems and data processing applications are not able to adequately curate, capture, search, store, share, transfer, visualize, or otherwise analyze the big data. Theoretical solutions for big data processing require hardware servers on the order of thousands to adequately process big data, which would result in massive costs and resources for companies and other entities.

Traditionally, resource provisioning for jobs has focused on provisioning computing resources without regard to network bandwidth. Rather than efficiently using bandwidth, more bandwidth was merely added to the system. Moreover, current interconnectivity solutions for Hadoop® ecosystems use traditional security models, which may not be suitable for sensitive information in custom environments. An example of traditional security settings that may be used include putting up a perimeter to protect a network as well as additional perimeters for more sensitive data.

SUMMARY

In one aspect, a computer implemented method for managing network resources within a server cluster is presented. The server cluster including one or more switches connected to one or more servers via one or more network links. The method may include receiving, via a computer network, a request for provisioning of an application and retrieving, via the computer network, management data defining a network topology of the server cluster. The method may also include determining, by one or more processors, a maximum network bandwidth for each network link in the server cluster and determining, by the one or more processors, a required amount of bandwidth for the application. The method may further include determining, by the one or more processors, a resource allocation of network bandwidth for the application to accommodate the maximum network bandwidth for each network link and provisioning, by the one or more processors, the application to a network resource within the server cluster with the resource allocation of network bandwidth.

The figures depict a preferred embodiment of the present invention for purposes of illustration only. One of ordinary skill in the art will readily recognize from the following discussion that alternative embodiments of the structures and methods illustrated herein may be employed without departing from the principles of the invention described herein.

DETAILED DESCRIPTION

This disclosure is directed to methods of defining networking using software in terms of secure and managed connectivity for a cluster of servers that facilitates both computation and storage at scale. A management entity, such as a resource provisioning manager, determines the amount of network bandwidth and support buffering being utilized by computing resources or storage traffic across applicable cluster network links. Network links may be defined and enabled based on location of storage for which computation is applied for authorized applications. The servers and network connectivity may be configured for and restricted to running authorized applications that compute at scale on large data where data spans more than one server and data storage is directly attached to each server.

Traditional systems may only provision network resources on a particular switch. Aspects of the present disclosure, however, consider network resources and bandwidth across the entire network with potentially numerous switches. In this manner, network resources are provisioned securely and to maximize the available bandwidth within the network. While a traditional system may provision a job to a particular server node based solely on the location of stored data, this provisioning may not effectively use the bandwidth of the system. Accordingly, jobs may be delayed or performed under non-optimal conditions, decreasing the overall efficiency of the system.

I. Exemplary System Architecture

Figure 1A:
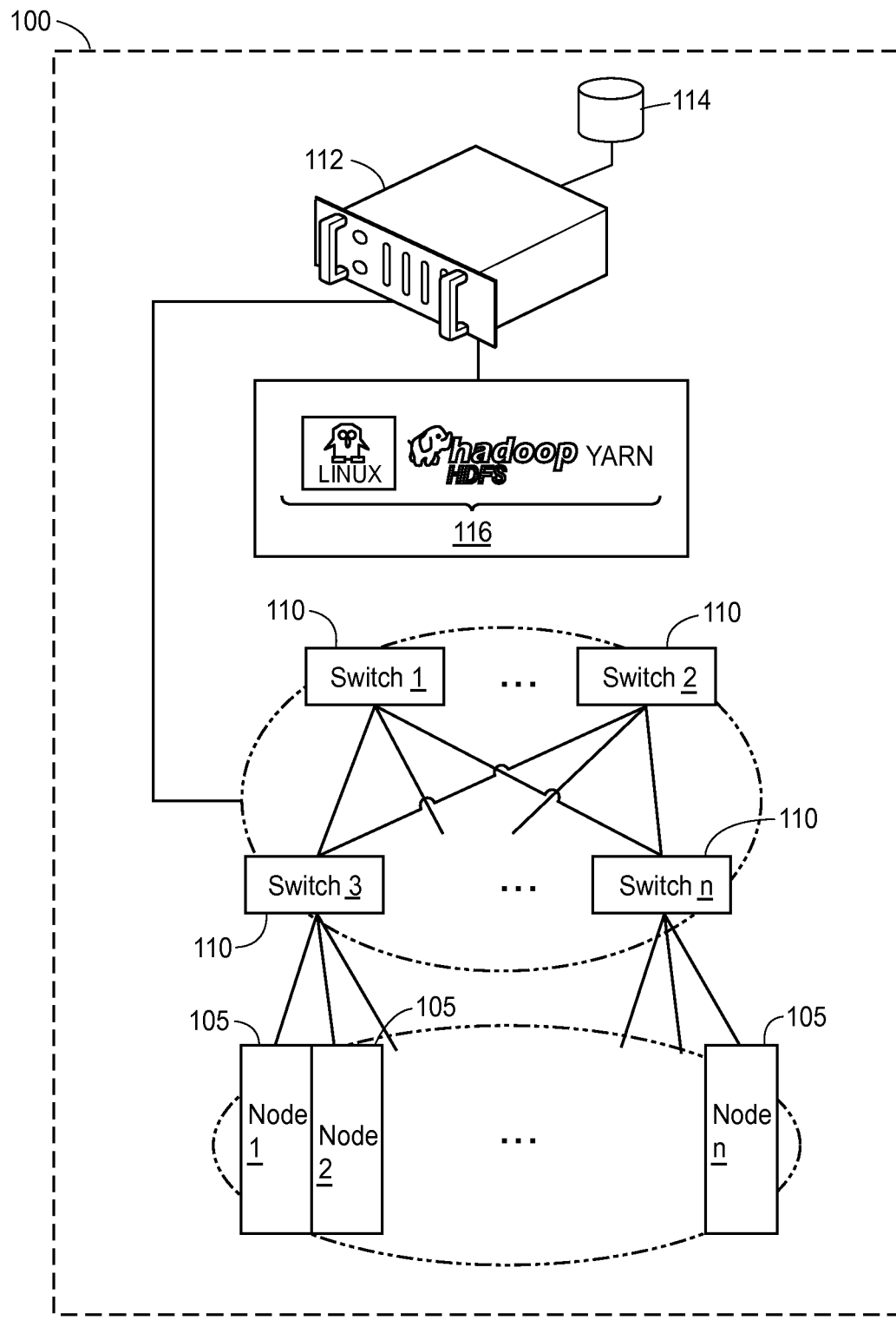
FIG. 1A is a simplified and exemplary configuration design for a system for scalable and secure interconnectivity in server cluster environments.
Figure 1B:
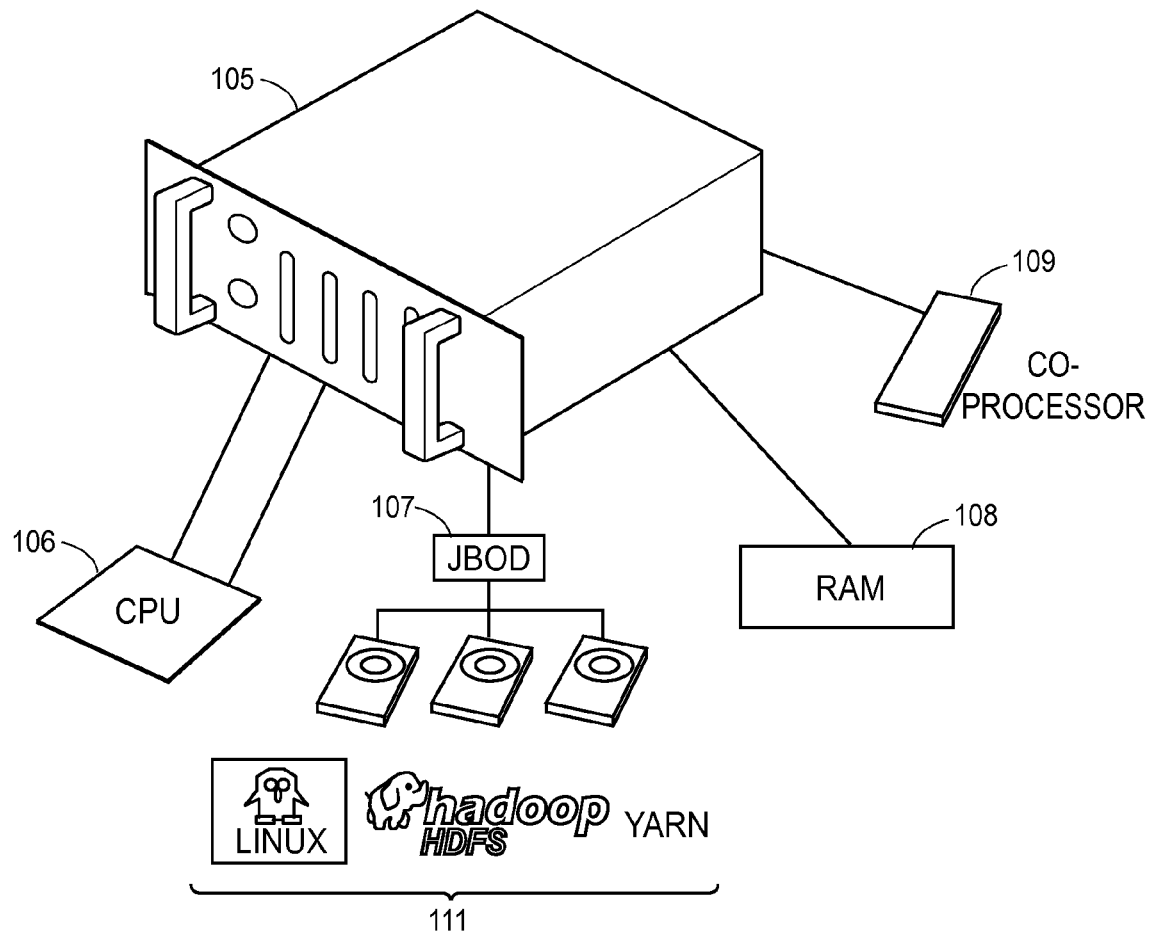
FIG. 1B is a simplified and exemplary configuration design of a server node in a system for scalable and secure interconnectivity in server cluster environments.
Figure 1C:
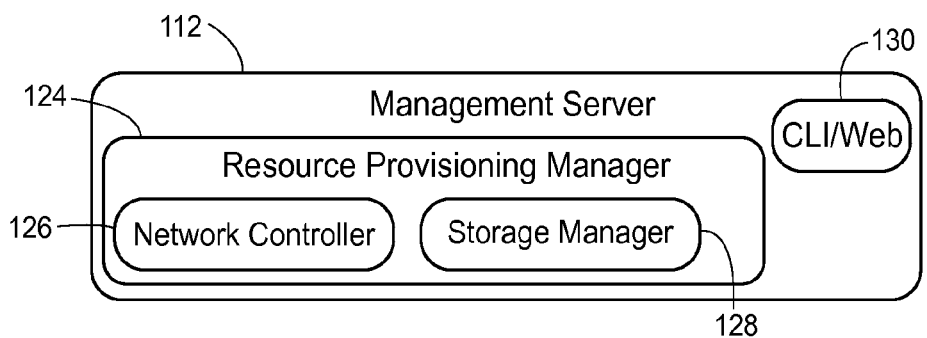
FIG. 1C is a simplified and exemplary software stack for use in a system for scalable and secure interconnectivity in server cluster environments

FIGS. 1A-1C illustrates various aspects of an exemplary architecture implementing a system 100 for scalable and secure interconnectivity for server cluster environments. The high-level architecture includes both hardware and software applications, as well as various data communications channels for communicating data between the various hardware and software components. The system 100 for scalable and secure interconnectivity for server cluster environments may include various software and hardware components or modules. The various modules may be implemented as computer-readable storage memories containing computer-readable instructions (i.e., software) for execution by one or more processors of the system 100 for scalable and secure interconnectivity for server cluster environments.

A. Exemplary Configuration Design

FIG. 1A depicts a configuration design for the system 100 for scalable and secure interconnectivity for server cluster environments. The system 100 is composed of a plurality of nodes (1-$n$) (105) with a plurality of software defined networking switches (1-$n$) 110 as a pool of resources for applications. In some aspects, one or more nodes 105 and switches 110 may be added or removed to accommodate capacity requirements and/or failure replacement. Although only three nodes 105 are depicted in FIG. 1, it should be appreciated that other numbers of nodes 105 and switches 110 are envisioned.

Turning now to FIG. 1B, in some aspects each node 105 can be designed to be equipped with one or more mid-range multi-core central processing units (CPU) 106, direct-attached storage (DAS) 107 consisting of a set of drives sometimes referred to as "just a bunch of disks" (JBOD), random access memory (RAM) 108, and one or more coprocessor cards 109. The precise configuration of each node 105 can depend on its purpose for addressing web-scale requirements.

For each node 105 to operate within the system 100, a stack of software 111 may be advantageous. In some aspects, the software stack 111 is designed to provide the kernel or operating system for the system 100. According to embodiments, the software stack 111 can be configured to include Linux 2.6+64 bit framework, the Hadoop® 2.0+ framework, and/or other frameworks. The precise stack configuration for each node 105 depends on the purpose for addressing web-scale requirements. It should be appreciated that the software stack 111 can include other frameworks or combinations of frameworks.

Referring again to FIG. 1A, networking between nodes 105 may be enabled with a networking device (such as a network switch 110 as shown in FIG. 1) where connectivity can be defined with software. The precise configuration of network connectivity depends on the purpose for addressing web-scale requirements.

C. Exemplary Management Server

A management server 112 may be used for provisioning resources within the system 100. The management server may be in communication with one or more databases 114, such as a management information database (MIB). Although only one management server 112 is depicted in FIG. 1, it should be appreciated that more than one is envisioned for high availability and scalability. The management server 112 may include a stack of software 116 for operation within the system 100. In some aspects, the software stack 116 is designed to provide the kernel or operating system for the system 100. According to embodiments, the software stack 116 can be configured to include Linux 2.6+64 bit framework, the Hadoop® 2.0+ framework, and/or other frameworks. It should be appreciated that the software stack 116 can include other frameworks or combinations of frameworks and the precise stack configuration may vary.

Turning now to FIG. 1C, the software stack 116 may include a resource provisioning manager 124 including a network controller 126, a storage manager 128 and an interface 130. The resource provisioning manager 113 may be a module running on the management server 112. In some aspects, the resource provisioning manager may provision applications to be executed in the cluster and manage scheduled and currently executing applications. The resource provisioning manger 124 allows for allocating compute, memory, storage, and network resources across the cluster for applications. This allocation, in effect for any given time, is based on the maximum amount of resource available within the cluster and where the data resides for computation by an application. For example, each application may require five Gigabits/second of network bandwidth and one Gigabyte of buffer. If the total network bandwidth available within the shared connections is 10 Gigabits/second and the total network buffering available is 10 Gigabytes, then the resource provisioning software assumes that the cluster on shared network links can support two applications.

The resource provisioning manager 124 may retrieve information defining where data is stored, the current bandwidth requirements of the jobs currently executing on the system, the maximum available bandwidth of the system, the total computational power of the jobs currently executing on the system, the maximum available computational power of the system, etc. Through this understanding of the data flow across the server cluster(s) the resource provisioning manager 124 may be able to intelligently direct and/or manage network resources including computational power and network bandwidth.

The network controller module 126 is typically connected to network switches via a network interface (such as an Ethernet interface) and may programmatically define networking, or interconnections of cluster servers.

The storage manager server module 128 may be used to locate data for computation by a given application. Data location supplied dictates co-location of computation and associated allocation of resources by the resource provisioning manager. The resource provisioning manager 113 may obtain network statistics from the MIB 114 such as amount of network traffic attributable to currently allocated applications on servers. In some aspects, the network traffic may be identified by Internet Protocol (IP) address. The resource provisioning manager 113 may also obtain Ethernet flow tables defining connectivity and network bandwidth currently in use. Accordingly, the resource provisioning manager 113 may establish or remove network flows by adding and removing entries in network switch flow tables to allocate connectivity and network bandwidth.

A command line interface and/or Web interface 130 may allow administrators to monitor and dynamically change configuration depending on network conditions.

Figure 2:
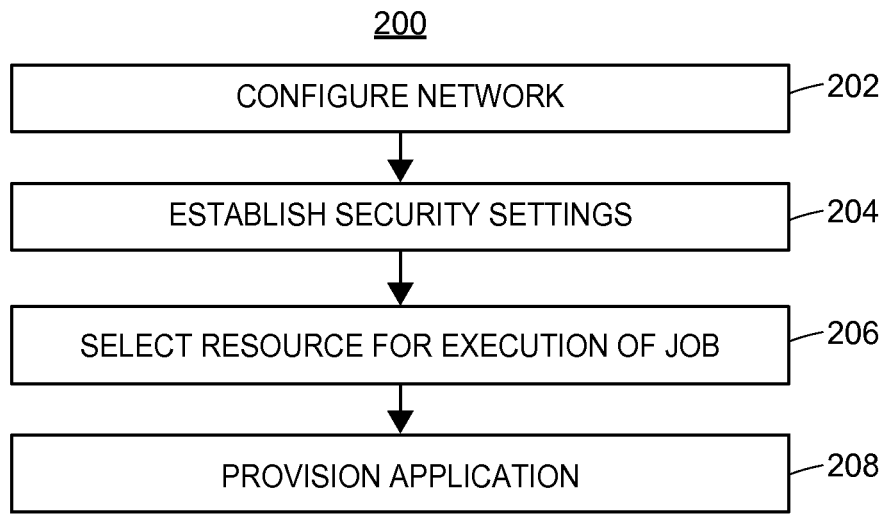
FIG. 2 is a flow chart illustrating an exemplary method for provisioning an application in a server cluster environment.

II. Exemplary Flow Chart for Provisioning an Application in a Server Cluster Environment FIG. 2 is a flowchart of a high level flow chart of an exemplary method, routine or process 200 for provisioning an application in a server cluster environment. A processor of a server may execute one or more instructions to configure a network (block 202). In some aspects, a server cluster may be established by coupling one or more network links, such as an Ethernet network link, between one or more switches and/or one or more servers. For example, the network topology may be similar to the network architecture described in reference to FIGS. 1A-1C, although other network topologies and/or network architectures may be used. Numerous network topologies may be used for the network configuration, such as, for example, a clos network topology or other network configurations known to those having ordinary skill in the art. The processor may further execute an instruction to establish security settings for the configured network (block 204).

In some aspects the network may be completely dark (i.e., have no active connections) by default. Connections may only be made dynamically when a request for provisioning is made. The processor may execute an instruction to determine if the job is authorized and only create a network connection after determining that the job is authorized. The security settings may include, for example, a list of authorized and/or scheduled applications, etc. In this manner, each network switch may generally function as a firewall. Accordingly, connectivity may be restricted to authorized servers and applications. Prerequisite network and server configuration may restrict servers to receipt of network traffic designated by IP address assigned.

The processor may further execute an instruction to select a network resource for the execution of a job (block 206). The job may be, for example, an application to be executed. The network resource may be a combination of one or more servers, one or more switches and/or one or more clusters in the network topology. In some aspects, the server and/or switch may be spread across different clusters. The processor may further execute an instruction to provision the job on the selected network resource (block 208).

In some aspects, the step of provisioning applications may include introducing applications for execution on the network by dynamically adding one or more of the applications with a predetermined amount of bandwidth. The predetermined amount of bandwidth may be established based on the type of communication framework used the application, such as Message Passing Interface (MPI). The predefined bandwidth may explicitly exclude buffering to avoid latency due to burst nature associated with the applications communication framework.

Although the above description is primarily directed to bandwidth availability for a single link between servers, in some aspects the network topology may include multiple physical paths between servers and as such the invention also may be implemented across multiple paths in a balanced manner. If one or more links, switches, or servers fail, other paths may be utilized by applications for resilience. The methods of the present invention may further comprise failover response to bandwidth availability.

III. Exemplary Flow Chart for Enabling Secure Interconnectivity

Figure 3:
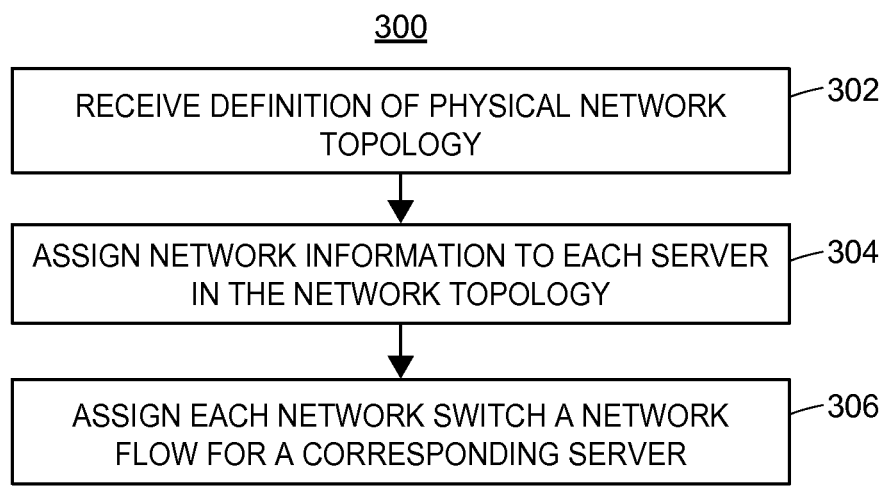
FIG. 3 is a flow chart illustrating an exemplary method for secure interconnectivity in a server cluster environment.

FIG. 3 is a high level flow chart of an exemplary method, routine or process 300 for enabling secure interconnectivity in a server cluster environment. A processor of a server may receive the definition of the physical network topology (block 302). For example, the network topology may be similar to the network architecture described in reference to FIGS. 1A-1C, although other network topologies and/or network architectures may be used. As described above, a variety of topologies may be used, such as a clos network topology. The processor may also execute an instruction to assign network information to each server in the network topology (block 304). For example, each server may be assigned a table of Internet Protocol (IP) and Media Access Control (MAC) addresses of all other servers in the cluster. The table may be used by the server as basis for authorization and connectivity. The processor may further execute an instruction to provision the job on the selected network resource (block 306). Upon, determining the resources to allocate to the job, the processor may further execute an instruction to assign each network switch coupled to a server an Ethernet flow with corresponding Internet Protocol addresses associated with the server on the Ethernet link. In some aspects, the processor may further execute an instruction to disable network switch functionality associated with automatic learning of network information (such as IP and MAC addresses) for the cluster servers.

As described above, in some aspects, the network may be blacked out by default. After determining the appropriate network resources, the network configuration information is sent to the network resources. For example, if a specific application is assigned to server node n and n+1, this information may be sent to the network switches. In this manner, a flow is enabled between the various network resources, such that the application can be executed properly.

In some aspects, the processor may further execute an instruction to issue commands to the one or more network switches upon completion of the schedule job. In this manner, the methods described herein may teardown the network flow and/or remove the connection established for the execution of the job.

IV. Exemplary Flow Chart for Enabling Flow to Network Resources

Figure 4:
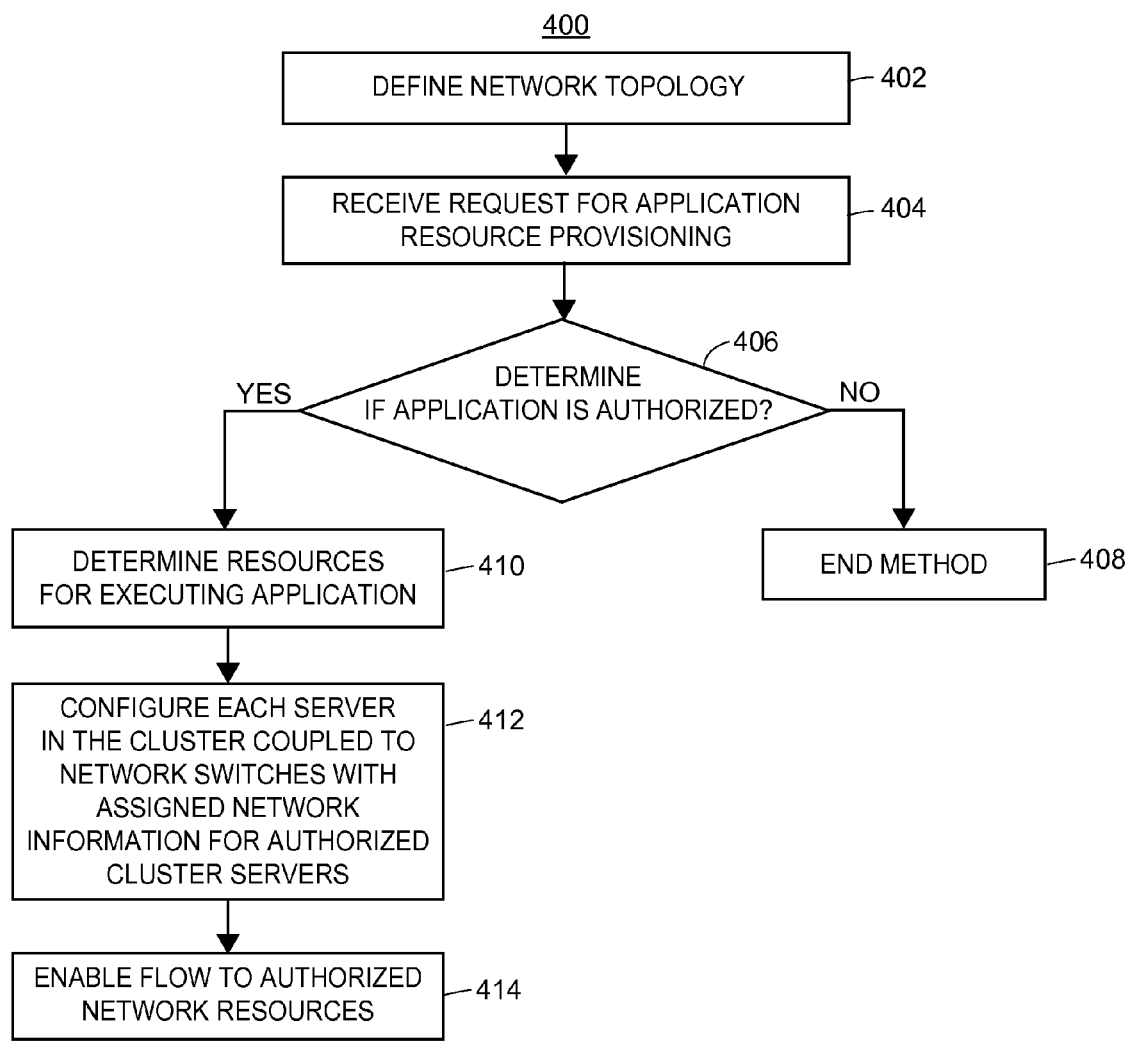
FIG. 4 is a flow chart illustrating an exemplary method for enabling flow to network resources in a server cluster environment.

FIG. 4 is a high level flow chart of an exemplary method, routine or process 400 for enabling flow to network resources in a server cluster environment. A processor of a server may execute an instruction to define the network topology (block 402). For example, the network topology may be similar to the network architecture described in reference to FIGS. 1A-1C, although other network topologies and/or network architectures may be used. As described above, a variety of topologies may be used, such as a clos network topology. The processor may further receive a request for application resource provisioning (block 404) and may execute an instruction to determine if the application is authorized (block 406). In some aspects, the processor may further execute an instruction to determine if the application resource provisioning request matches an authorized application on a list of authorized and/or scheduled applications. If the processor executing the instruction determines that the application is not authorized (NO branch of block 406), the processor may execute an instruction to end the method 400 (block 408).

If the processor executing the instruction determines that the application is authorized (YES branch of block 406), the processor may further execute an instruction to determine network resources for executing the application (block 410). The processor may also execute an instruction to configure each server coupled to the network switches with the assigned network information for authorized clusters (block 412). The processor may further execute an instruction to enable flow to authorized network resources (block 414).

V. Exemplary Flow Chart for Provisioning Bandwidth

Figure 5:
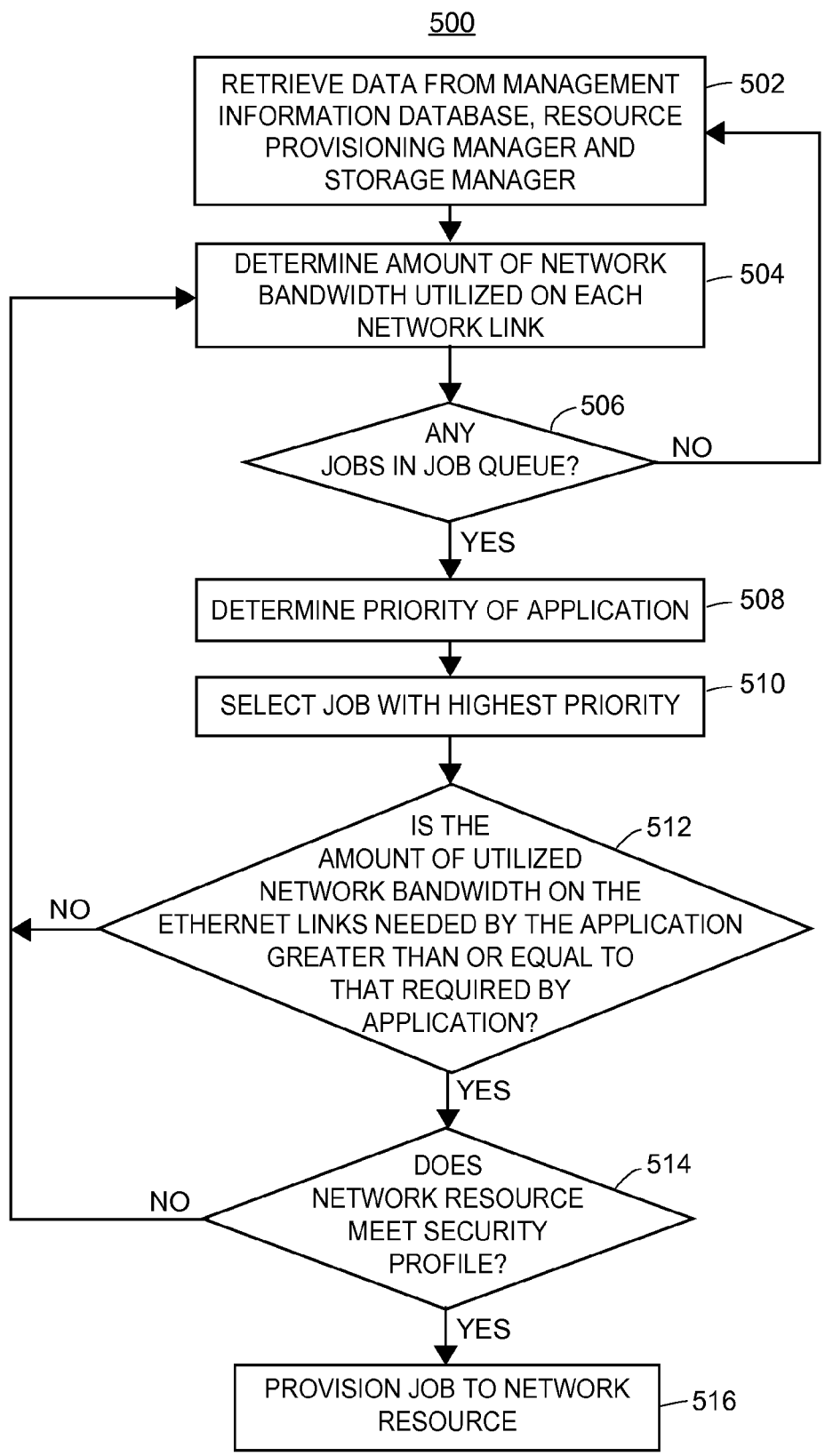
FIG. 5 is a flow chart illustrating an exemplary method for provisioning bandwidth in a server cluster environment.

FIG. 5 is a high level flow chart of an exemplary method, routine or process 500 for provisioning bandwidth in a server cluster environment. The processor may execute an instruction to retrieve data for managing network resources and jobs (block 502). This data may be retrieved from, for example, a management information database, a resource provisioning manager and/or a storage manager. The data for managing network resources and jobs may include information regarding the current use of network resources, including what resources are currently being used, what resources are available, the location of various data, as well as required resources for currently executing jobs and queued jobs.

For example, the management information database may store data regarding the network switches within the cluster to determine the maximum network bandwidth for each of the coupled links between switches and servers. The resource provisioning manager may store a list of authorized applications queued for execution. The storage manager may store information such as the Internet Protocol address of each of the servers containing data for which computation will be performed locally, where possible, for each application.

The processor may further execute an instruction to determine the amount of network bandwidth utilized on each network link between one or more switches and/or one or more servers (block 504). For example, a processor accessing the management information database may be able to determine whether actual usage of network resources meets expectations/predictions. The processor may also execute an instruction to determine if any jobs exist in the job queue (block 506). As discussed above, a variety of jobs may be envisioned for use in the system, such as applications to be run on network resources. If the processor determines that there are no jobs in the job queue (NO branch of block 506), the processor may execute an instruction to retrieve data for managing network resources and jobs and continue the method from block 502. If the processor executing the instruction determines that one or more jobs exist in the job queue (YES branch of block 506), the processor may further execute an instruction to determine the priority of each job in the job queue and to select the job with the highest priority (block 510). The processor may then execute an instruction to determine a resource allocation of network bandwidth. For example, the processor may execute an instruction to determine if the amount of available network bandwidth is greater than or equal to the available network bandwidth required by the application. If the processor determines that the amount of available bandwidth is not greater than or equal to the available network bandwidth required by the application (NO branch of block 512), then the processor may return to block 506.

If the processor determines that the amount of available bandwidth is greater than or equal to the network bandwidth required by the application (YES branch of block 512), the processor may further execute an instruction to determine if the security profile is met (block 514). For example, the processor may execute an instruction to determine if the application meets the security profile and/or if the selected network resources meet the security profile.

If the processor determines that the security profile is not met (NO branch of block 514), then the processor may return to block 506. If the processor determines that the security profile is met (YES branch of block 514), the processor may further execute an instruction to provision the job to a network resource (block 516). For example, a scheduled application may be provisioned to one or more servers for execution and one or more databases for storage and/or data retrieval. After provisioning the application, the processor may determine if any jobs exist in the job queue and continue the method from block 506.

In some aspects, the processor may further execute an instruction to enforce a time delay after introducing applications for execution before allowing additional applications. This delay may serve to remove startup and shutdown processing which are likely to be lull network activity periods.

A number of techniques can be used to provision additional authorized applications based on network bandwidth needs. In one aspect, one or more of the applications presently executing may be utilizing more than minimal authorized bandwidth and that bandwidth at minimal levels would free bandwidth greater than or equal to required bandwidth for one or more applications in the queue for execution. In another aspect, one or more of the applications presently executing may be utilizing bandwidth in bursts that self-resolve over-subscription with allocated buffering and that one or more additional bandwidth burst applications on the queue for execution can be added.

VII. Exemplary Computing Device

Figure 6:
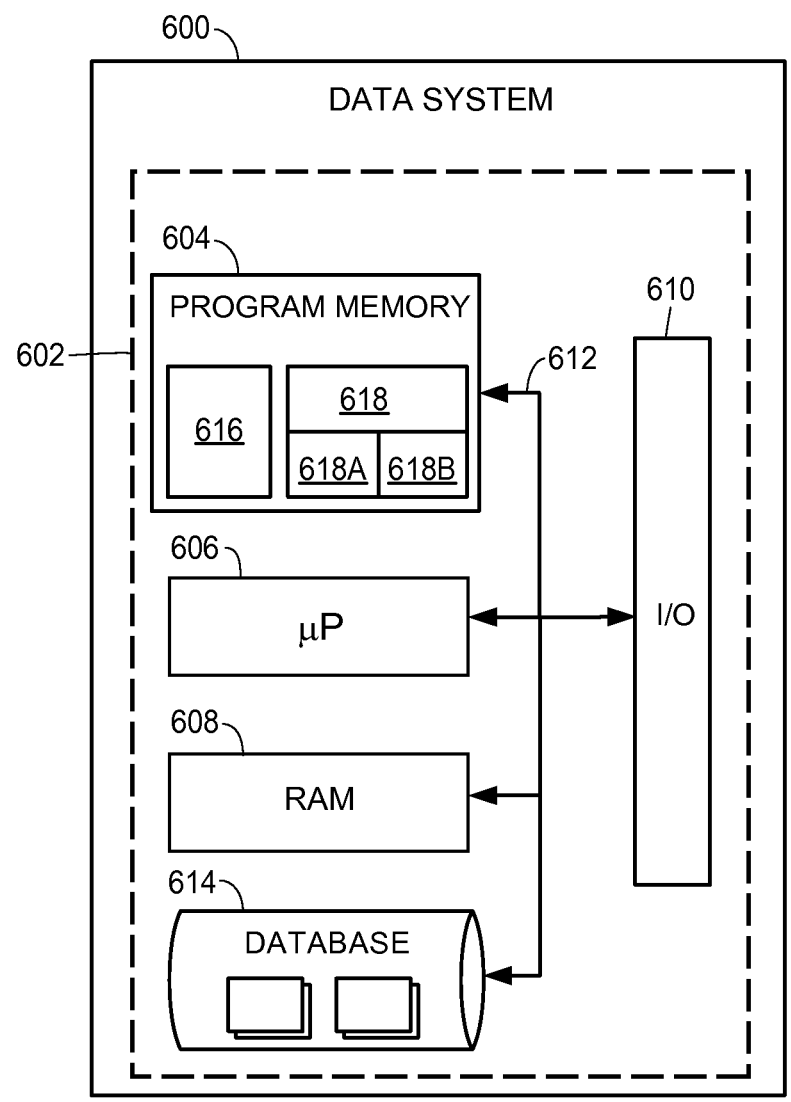
FIG. 6 is an exemplary architecture of a computing device.

Referring now to FIG. 6, a computing device 600 includes a controller 602. Exemplary computing devices include the server 112, the storage device 114, or any combination of computing devices within the system 100 illustrated in FIG. 1. The controller 602 may include a program memory 604, a microcontroller or a microprocessor (µP) 606, a random-access memory (RAM) 608, and an input/output (I/O) circuit 610, all of which may be interconnected via an address/data bus 612. The program memory 604 may store computer-executable instructions, which may be executed by the microprocessor 606. In some embodiments, the controller 602 may also include, or otherwise be communicatively connected to, a database 614 or other data storage mechanism (e.g., one or more hard disk drives, optical storage drives, solid state storage devices, etc.). It should be appreciated that although FIG. 6 depicts only one microprocessor 606, the controller 602 may include multiple microprocessors 606. Similarly, the memory 604 of the controller 602 may include multiple RAMs 616 and multiple program memories 618, 618A and 618B storing one or more corresponding application modules, according to the controller's particular configuration. The computing device 600 may also include specific routines to be performed by the computing device 600.

Although FIG. 6 depicts the I/O circuit 610 as a single block, the I/O circuit 610 may include a number of different types of I/O circuits (not depicted). The RAM(s) 608, 604 and the program memories 618, 618A and 618B may be implemented in a known form of computer storage media, including but not limited to, semiconductor memories, magnetically readable memories, and/or optically readable memories, for example, but does not include transitory media such as carrier waves.

VIII. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the storage device 114, the server 112, or any combination of computing devices within the system 100). The routines may be included as part of any of the modules described in relation to FIG. 1 or 2 or as part of a module that is external to the system illustrated by FIGS. 1 and 2.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments may be implemented, using either current technology or technology developed after the filing date of this patent, which would still fall within the scope of the claims.

Upon reading this disclosure, those of skill in the art will appreciate still additional alternative structural and functional designs for system and method for concealing sensitive data on a computing device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer implemented method for managing network resources within a server cluster, the server cluster including one or more switches connected to one or more servers via one or more network links, the method comprising:

receiving, via a computer network, a request for provisioning of an application to be executed by the server cluster;

retrieving, via the computer network, management data defining a network topology of the server cluster;

determining, by one or more processors, a maximum network bandwidth for each network link in the server cluster;

determining, by the one or more processors, a required amount of bandwidth for the application;

determining, by the one or more processors, a resource allocation of network bandwidth for the application to accommodate the maximum network bandwidth for each network link;

matching, by the one or more processors, the application to an approved application on a list of approved applications;

determining, by the one or more processors, that the application meets a required security profile;

after determining that the application meets the required security profile, provisioning, by the one or more processors, the application to a network resource within the server cluster with the resource allocation of network bandwidth;

determining, by the one or more processors, that an additional application is to be provisioned to the server cluster, wherein the additional application utilizes bandwidth in bursts;

determining, by the one or more processors, that the server cluster can support bandwidth requirements of the additional application, at least in part by determining that one or more applications currently provisioned to the server cluster are also utilizing bandwidth in bursts; and after determining that the server cluster can support bandwidth requirements of the additional application, provisioning, by the one or more processors, the additional application to another network resource within the server cluster.

2. The computer-implemented method of claim 1, wherein the network resource is one or more authorized servers within the server cluster, the computer-implemented method further comprising:

configuring, by the one or more processors, at least one switch with configuration information to connect to the one or more authorized servers for executing the application.

3. The computer-implemented method of claim 2 further comprising:

enabling a connection between at least one switch and at least one authorized server in response to provisioning the application.

4. The computer-implemented method of claim 3 further comprising:

removing the connection between the at least one switch and the at least one authorized server in response to completion of the application.

5. The computer-implemented method of claim 1 further comprising:

receiving, via the computer network, Internet Protocol and Media Access Control addresses for each server and switch in the server cluster.

6. The computer-implemented method of claim 1 further comprising:

identifying, by the one or more processors, one or more currently running applications on a first network link;

determining, by the one or more processors, a minimum amount of network bandwidth being used by the one or more currently running applications on the first network link;

determining, by the one or more processors, an available amount of bandwidth based on the required amount of bandwidth for the application and the minimum amount of network bandwidth being used by the one or more currently running applications on the first network link; and determining, by the one or more processors, that the minimum amount of network bandwidth is greater than or equal to the required bandwidth amount for the application.

7. A computer device for managing network resources within a server cluster, the server cluster including one or more switches connected to one or more servers via one or more network links, the device comprising:

one or more processors; and one or more memories coupled to the one or more processors;

the one or more memories including non-transitory computer executable instructions stored therein that, when executed by the one or more processors, cause the one or more processors to:

receive, via a computer network, a request for provisioning of an application to be executed on the server cluster;

retrieve, via the computer network, management data defining a network topology of the server cluster;

determine a maximum network bandwidth for each network link in the server cluster;

determine a required amount of bandwidth for the application;

determine a resource allocation of network bandwidth for the application to accommodate the maximum network bandwidth for each network link;

match the application to an approved application on a list of approved applications;

determine that the application meets a required security profile;

after determining that the application meets the required security profile, provision the application to a network resource within the server cluster with the resource allocation of network bandwidth;

determine that an additional application is to be provisioned to the server cluster, wherein the additional application utilizes bandwidth in bursts;

determine that the server cluster can support bandwidth requirements of the additional application, at least in part by determining that one or more applications currently provisioned to the server cluster are also utilizing bandwidth in bursts; and after determining that the server cluster can support bandwidth requirements of the additional application, provision the additional application to another network resource within the server cluster.

8. The computer device of claim 7, wherein the network resource is one or more authorized servers within the server cluster, further comprising non-transitory computer executable instructions to cause the one or more processors to:

configure at least one switch with configuration information to connect to the one or more authorized servers for executing the application.

9. The computer device of claim 7, further comprising non-transitory computer executable instructions to cause the one or more processors to:

enable a connection between at least one switch and at least one authorized server in response to provisioning the application.

10. The computer device of claim 9, further comprising non-transitory computer executable instructions to cause the one or more processors to:

remove the connection between the at least one switch and the at least one authorized server in response to completion of the application.

11. The computer device of claim 7, further comprising non-transitory computer executable instructions to cause the one or more processors to:

receive Internet Protocol and Media Access Control addresses for each server and switch in the server cluster.

12. The computer device of claim 7, further comprising non-transitory computer executable instructions to cause the one or more processors to:

identify one or more currently running applications on a first network link;

determine a minimum amount of network bandwidth being used by the one or more currently running applications on the first network link;

determine an available amount of bandwidth based on the required amount of bandwidth for the application and the a minimum amount of network bandwidth being used by the one or more currently running applications on the first network link; and determine that the minimum amount of network bandwidth is greater than or equal to the required bandwidth amount for the application.

13. A non-transitory computer readable storage medium storing instructions for managing network resources within a server cluster, the server cluster including one or more switches connected to one or more servers via one or more network links, the instructions when executed on one or more processors cause the one or more processors to:

receive, via a computer network, a request for provisioning of an application to be executed on the server cluster;

retrieve, via the computer network, management data defining a network topology of the server cluster;

determine a maximum network bandwidth for each network link in the server cluster;

determine a required amount of bandwidth for the application;

determine a resource allocation of network bandwidth for the application to accommodate the maximum network bandwidth for each network link;

match the application to an approved application on a list of approved applications;

determine that the application meets a required security profile;

after determining that the application meets the required security profile, provision the application to a network resource within the server cluster with the resource allocation of network bandwidth;

determine that an additional application is to be provisioned to the server cluster, wherein the additional application utilizes bandwidth in bursts;

determine that the server cluster can support bandwidth requirements of the additional application, at least in part by determining that one or more applications currently provisioned to the server cluster are also utilizing bandwidth in bursts; and after determining that the server cluster can support bandwidth requirements of the additional application, provision the additional application to another network resource within the server cluster.

14. The computer readable storage medium of claim 13, wherein the network resource is one or more authorized servers within the server cluster, comprising further instructions stored thereon that cause the one or more processors to:

configure at least one switch with configuration information to connect to the one or more authorized servers for executing the application.

15. The computer readable storage medium of claim 14, comprising further instructions stored thereon that cause the one or more processors to:

enable a connection between at least one switch and at least one authorized server in response to provisioning the application.

16. The computer readable storage medium of claim 15, comprising further instructions stored thereon that cause the one or more processors to:

remove the connection between the at least one switch and the at least one authorized server in response to completion of the application.

17. The computer readable storage medium of claim 13, comprising further instructions stored thereon that cause the one or more processors to:

receive Internet Protocol and Media Access Control addresses for each server and switch in the server cluster.

18. The computer readable storage medium of claim 13, comprising further instructions stored thereon that cause the one or more processors to:

identify one or more currently running applications on a first network link;

determine a minimum amount of network bandwidth being used by the one or more currently running applications on the first network link;

determine an available amount of bandwidth based on the required amount of bandwidth for the application and the a minimum amount of network bandwidth being used by the one or more currently running applications on the first network link; and determine that the minimum amount of network bandwidth is greater than or equal to the required bandwidth amount for the application.

\* \* \* \* \*